United States Patent [19]

Kawamura et al.

[11] Patent Number: 5,585,845
[45] Date of Patent: Dec. 17, 1996

[54] ELECTRONIC STILL CAMERA HAVING DATA STORAGE DEVICE AND METHOD FOR RECORDING IMAGE DATA WITHIN SAID DATA STORAGE DEVICE

[75] Inventors: Koichiro Kawamura, Shonan-machi; Masahiro Suzuki, Kawasaki, both of Japan

[73] Assignee: Nikon Corporation, Tokyo, Japan

[21] Appl. No.: 567,743

[22] Filed: Dec. 5, 1995

Related U.S. Application Data

[63] Continuation of Ser. No. 265,816, Jun. 27, 1994, abandoned.

[30] Foreign Application Priority Data

Jun. 25, 1993 [JP] Japan ................................ 5-179852

[51] Int. Cl.$^6$ .................................................. H04N 5/76
[52] U.S. Cl. ........................ 348/231; 348/233; 358/909.1
[58] Field of Search .................................... 348/222, 231, 348/233, 714; 358/909.1, 906; H04N 5/76

[56] References Cited

U.S. PATENT DOCUMENTS

| | | | |
|---|---|---|---|
| 5,153,729 | 10/1992 | Saito | 348/233 |
| 5,164,831 | 11/1992 | Kuchta | 348/233 |
| 5,226,145 | 7/1993 | Moronaga | 348/231 |

*Primary Examiner*—John K. Peng
*Assistant Examiner*—Sherrie Hsia

[57] ABSTRACT

An electronic still camera includes, but is not limited to, an imaging unit to produce image data corresponding to an image of a subject to be imaged, a recording medium to record the image data and a sequence controller to control recording of the image data on the recording medium. The sequence controller is configured to modify specified data to be recorded at a beginning of the recording of the image data on the recording medium. The specified data indicates the validity of the image data. Additionally, a method is provided which includes, but is not limited to the steps of establishing a temporary identifier to be associated with a quantity of image data, recording the temporary identifier and the image data on a memory device modifying the temporary identifiers to be a modified identifier after the image data has been properly recorded and recording the modified identifier in the memory device.

18 Claims, 5 Drawing Sheets

ELECTRONIC STILL CAMERA HAVING DATA STORAGE DEVICE AND METHOD FOR RECORDING IMAGE DATA WITHIN SAID DATA STORAGE DEVICE

This application is a continuation of application Ser. No. 08/265,816, filed Jun. 27, 1994, now abandoned.

BACKGROUND OF THE INVENTION

1. Technical Field

The present invention relates to electronic still cameras and methods of recording image data within such electronic still cameras.

2. Description of the Related Art

Electronic still cameras convert an image of a subject into electrical signals using an image-pickup element such as a charged coupled device (CCD). Such cameras have circuitry to convert the electrical signals into digital data which are recorded on a recording medium such as in a memory card or on a magnetic medium (e.g., a hard or flexible disc). A typical and exemplary signal processing circuit of an electronic still camera is shown in FIG. 3.

Referring now to FIG. 3, it will be observed that the signal processing circuit therein depicted consists of a lens system (not shown), a shutter for controlling exposures, an image-pickup processor 1 which receives image light from a subject through an aperture, an A/D converter 2, a buffer memory 3, a compressor 4, a card interface (I/F) 5, a memory card 6 for recording image data and a sequence controller 7.

It will be further observed that after converting image light from a subject into electrical signals using a photoelectric conversion element such as a CCD, the image-pickup processor 1 performs signal processing such as gamma conversion to generate image signals. A/D converter 2, converts the aforementioned image signals from the image-pickup processor 1 into digital signals and stores such digital signals (e.g., data) in buffer memory 3 as image data.

Data (i.e., imaging data) which has been stored in buffer memory 3 is read out as required and also is supplied to compressor 4 wherein data compression is performed. The output of compressor 4 is compressed image data. The compressed image data is recorded in memory card 6 via card I/F 5.

Sequence controller 7 is a data recover unit which performs control of a series of photographic operations including management of memory card 6 and sequence control of all other systems. In the case where image data is recorded to memory card 6 without first performing compression, no processing need be performed by compressor 4, and the image data read from buffer memory 3 is recorded "as is" to memory card 6 through I/F 5.

As is well known, when data is recorded to a memory card, data management operations need be performed to accurately store and retrieve valuable data and information and to effectively and efficiently manage the space limitations of the recording medium (i.e., to avoid exhausting system resources). Such data management operations include the manipulation of data management data (i.e., meta data—data about image data such as file names, file storage parameters, file sizes, etc.). Additionally, when manipulating data, there is often the need to manipulate data management data such as record start addresses and data segment sizes. Various systems have been used to perform such data management operations. One such system utilizes the well-known MS-DOS operating system which is explained below.

Referring now to FIG. 4, therein depicted is a typical case where data is recorded to a memory card using the MS-DOS operating system. At one level, MS-DOS provides for the management of data in units called "clusters." The size of one (1) cluster varies according to the formatting method of a recordable media, but is typically 512 KB or 1024 KB. If the volume of the data that a persons wishes to store becomes large, several clusters are used and chained together via addressing utilizing conventional techniques.

Parameters which are necessary when data is to be written to and read from a memory device such as a memory card include the number of FATs (file allocation tables) and the number of route directory entries. These parameters are recorded in a boot sector region of a recordable medium. When multiple clusters are used in data recording, their chained data is recorded in the FAT region. Also, as shown in FIG. 5, the file names for the respective recorded data, the cluster number at which recording was started, the data size, and other data are recorded in the route directory region.

As an example, when data is recorded using three clusters, clusters 2, 3, and 4 under file name FILE001, the next cluster number, "3" is recorded into the FAT region of cluster 2 and, at the same time, "4" is recorded to the FAT region of cluster 3, then a code, which signifies that it is the final cluster is recorded in the FAT of cluster 4. That final code is "FFFh", for example, in the case of a 12-bit FAT. Moreover, FILE001 is recorded as the file name and "2" is recorded as the cluster start number in the region of directory entry 1 of the route directory region.

Referring now to FIG. 6, therein depicted is a flow chart which illustrates the procedures which are to be performed in the case in which data is actually recorded to a memory card. Before recording the data, it is necessary to perform processing to search for empty or available clusters, but this processing is assumed to have been performed in advance with there having been empty or available clusters present. First, in response to the record start, data is recorded to the first empty cluster L in step 102. Next, in step 103, data such as the file name, the record start cluster number L, and the file size are recorded to the directory entry section inside the route directory region.

Next, in step 104, a determination is made as to whether all of the data has been recorded. If not, processing commences in step 105, and if so, processing commences in step 113. That is, if there is data of a size which can be recorded into one cluster, processing commences in step 113. If step 113 has been proceeded to, a completion code which signifies that it is the last cluster is recorded to the FAT region of cluster L, and processing is completed. For example, as explained above, FFFh is recorded for the completion code in the case of a 12-bit FAT.

If it has been determined that all of the data has not been recorded in step 104, processing commences in step 105 wherein data is recorded into cluster M, which is the next empty cluster. In step 106, the cluster M number, that is, M, is recorded to the FAT region of cluster L as chained data which has been recorded into cluster L and then into cluster M.

In step 107, a determination is again made as to whether all of the data has been recorded. If not, processing commences in step 108 and, if so, processing commences in step 114. That is, if there is data of a size which can be recorded into two clusters, processing commences in step 114. If step 114 has been proceeded to, a completion code (FFFh in the case of a 12-bit FAT) which indicates that it is the last cluster is recorded to the FAT region of cluster M, and processing is completed.

In contrast to the operations described above, if it has been determined that all of the data has not been recorded in step 107, processing is commenced in step 108 wherein data is recorded into cluster N, which is the next empty cluster. Next, in step 109, the cluster N number, that is, N, is recorded to the FAT region of cluster M as chained data which has been recorded into cluster M and then into cluster N.

Next, in step 110, if it is determined that not all of the data has been recorded, processing is again commenced in step 108 wherein there is recording to cluster N, which is the next empty cluster, and the same type of operation is repeated thereafter. If all of the data has been recorded, processing is commenced in step 111, and a completion code (FFFh in the case of a 12-bit FAT) which signifies that it is the last cluster is recorded to the FAT region of cluster N, and processing is completed.

With electronic still cameras of the type mentioned above, a problem is realized when a memory card is removed, a battery of the electronic still camera body is removed or fails, or a sharp drop in battery capacity occurs while data is being recorded to the memory card. In such situations, the recording of data is interrupted or improperly and/or erroneously carried out. In such cases, a type of nonconformity occurs in data such as the FAT data and directory entry, which are the aforementioned chained data. That is, the FAT chain is interrupted, and there are cases in which the actually recorded data size and the file size recorded in the directory entry do not match and in which some type of chained data is recorded in the FAT of a cluster which is actually not in use, making the data unusable and erroneous.

For example, in the aforementioned recording example, when recording is interrupted while cluster 3 is being recorded, neither the number of the cluster recorded next nor the end code are recorded in the FAT of cluster 3. Moreover, irregularities can result which include the file size inside the directory entry differing from the actually recorded data size. In this way, when some irregularity occurs in data such as the FAT data and the directory entry, which are the chained data recorded to the memory card, even if the recording data related to that irregularity is accessed later and fetched, an appropriate image cannot be obtained. Also, because data with this type of irregularity is recorded in the memory card as invalid data, irregularities such as not being able to effectively utilize the recording range of the memory card can and often does occur.

In view of the foregoing comments, the purpose of the present invention is to take the problems of the aforementioned prior art into consideration and to recover and remove, as necessary, invalid data in the memory card, which occurs due to recording operations and procedures being interrupted or improperly carried out, while making it possible to detect interruptions in recording which arise due to such anomalistic situations as, for example, the memory card being removed, the battery of the electronic still camera body being removed, or the realization of sharp drops in battery capacity occurring while data is being recorded to the memory card or other recording mediums and systems.

SUMMARY OF THE INVENTION

In view of the foregoing comments, it is an object of the present invention to solve the above-mentioned problems.

It is another object of the present invention to provide an electronic still camera in which image data is efficiently and accurately recorded on a memory device of the electronic still camera even in cases where the memory device realizes unexpected operational irregularities such as memory removal and battery failure.

It is yet another object of the present invention to provide an electronic still camera in which a convenient and easily used resource management system operates to insure proper recording of image data.

It is still a further object of the present invention to provide a method of recording image data in an electronic still camera in which image data is properly recorded even in cases where the electronic still camera experiences unexpected operational irregularities.

These and other objects are achieved by the present invention in that an electronic still camera is provided which includes, but is not limited to, an imaging unit to produce image data corresponding to an image of a subject to be imaged, a recording medium to record the image data and a sequence controller to control recording of the image data on the recording medium. The sequence controller is configured to modify specified data to be recorded at a beginning of the recording of the image data on the recording medium. The specified data indicates the validity of the image data.

The present invention also provides a method of recording image data in an addressable read/write memory device of an electronic still camera so that the above-mentioned problems are solved. The method of the present invention includes the steps of establishing a temporary identifier to be associated with a quantity of image data, recording the temporary identifier and the image data on a memory device modifying the temporary identifiers to be a modified identifier after the image data has been properly recorded and recording the modified identifier in the memory device.

BRIEF DESCRIPTION OF THE DRAWINGS

The present invention is described with reference to the attached drawing figures of which.

DETAILED DESCRIPTION OF THE PREFERRED EMBODIMENTS

Figure 1:
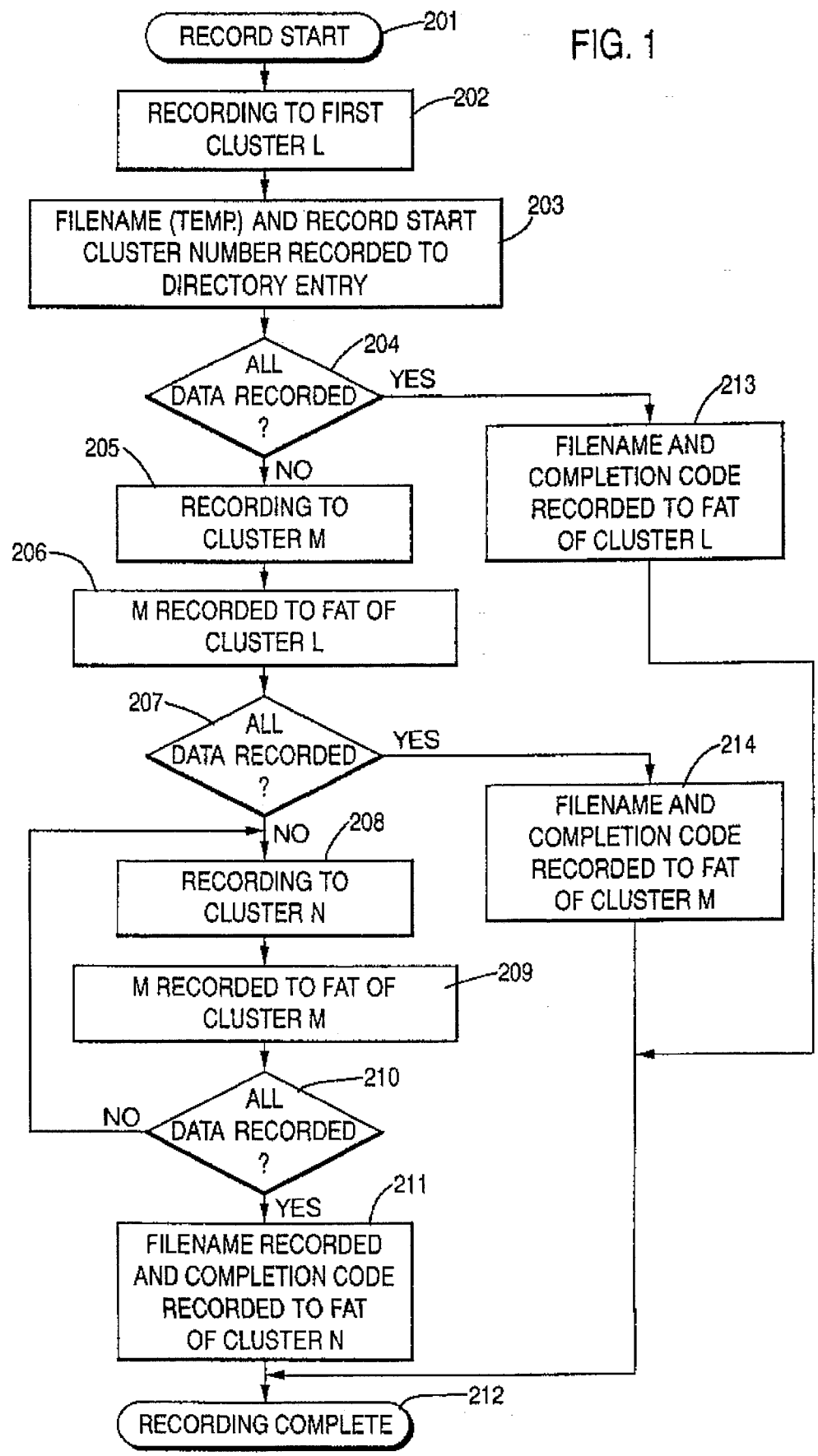
FIG. 1 is a flow chart which illustrates the data recording procedures carried out by an electronic still camera according to an embodiment of the present invention.

The present invention will now be described with reference to the drawing figures which were briefly described above. Like parts will be referred to with like reference numerals.

Figure 3:
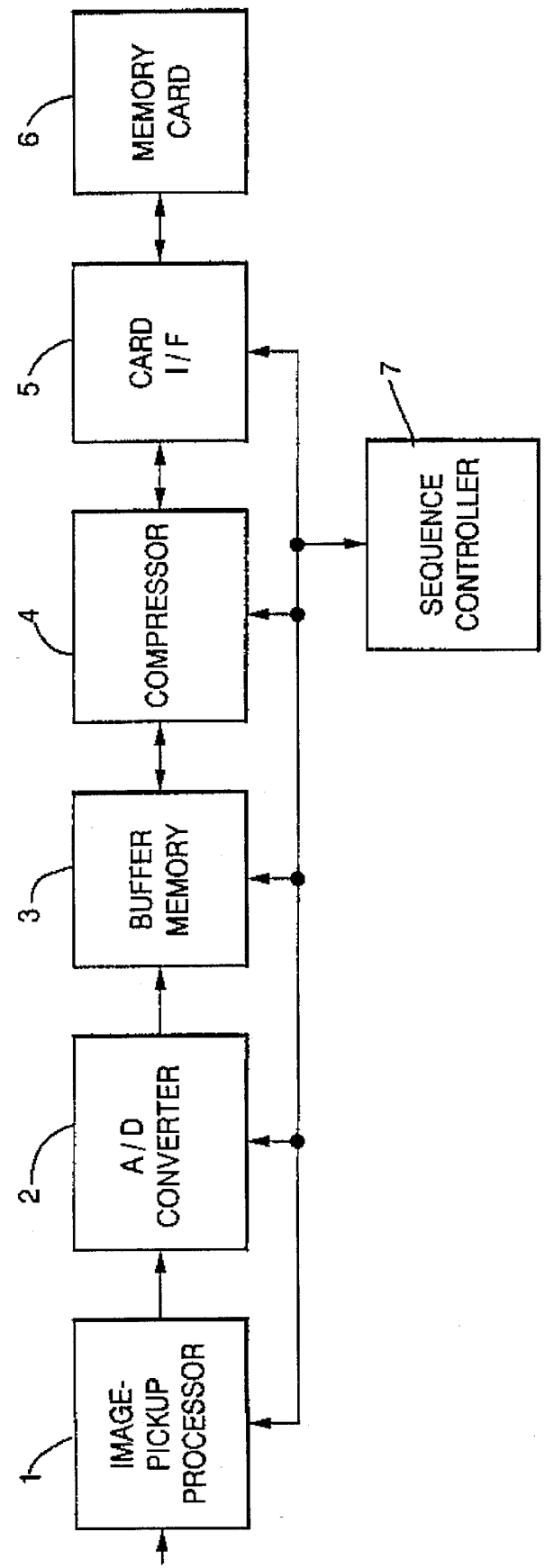
FIG. 3 is a block diagram which illustrates a circuit configuration of an electronic still camera according to the prior art.
Figures 4, 5:
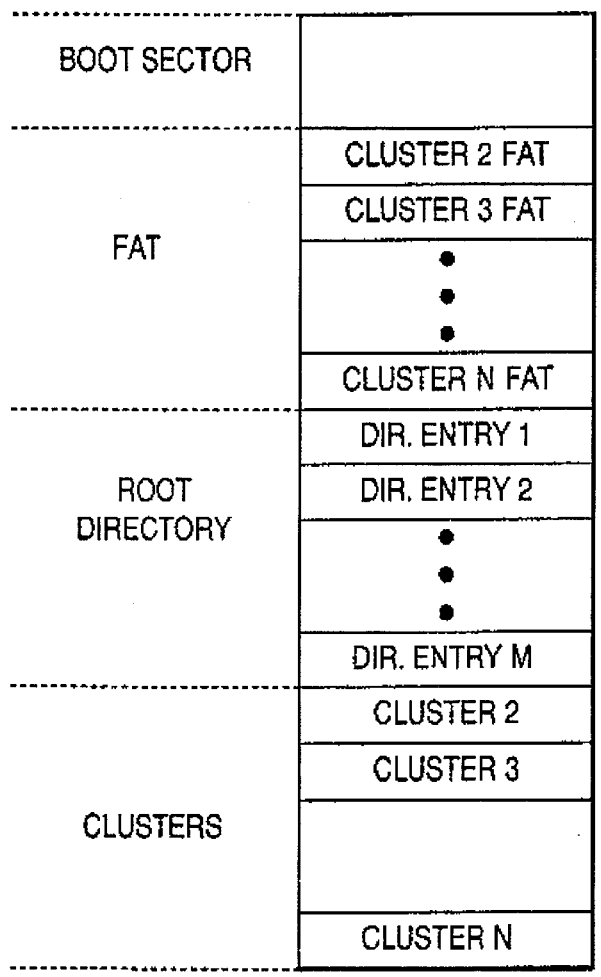
FIG. 4 is a diagram which illustrates the format of the recording regions for recording respective data to a memory device such as a memory card of the electronic still camera depicted in FIG. 3.
FIG. 5 is a diagram which illustrates the format of data recorded in the directory entry region of FIG. 4.
Figure 6:
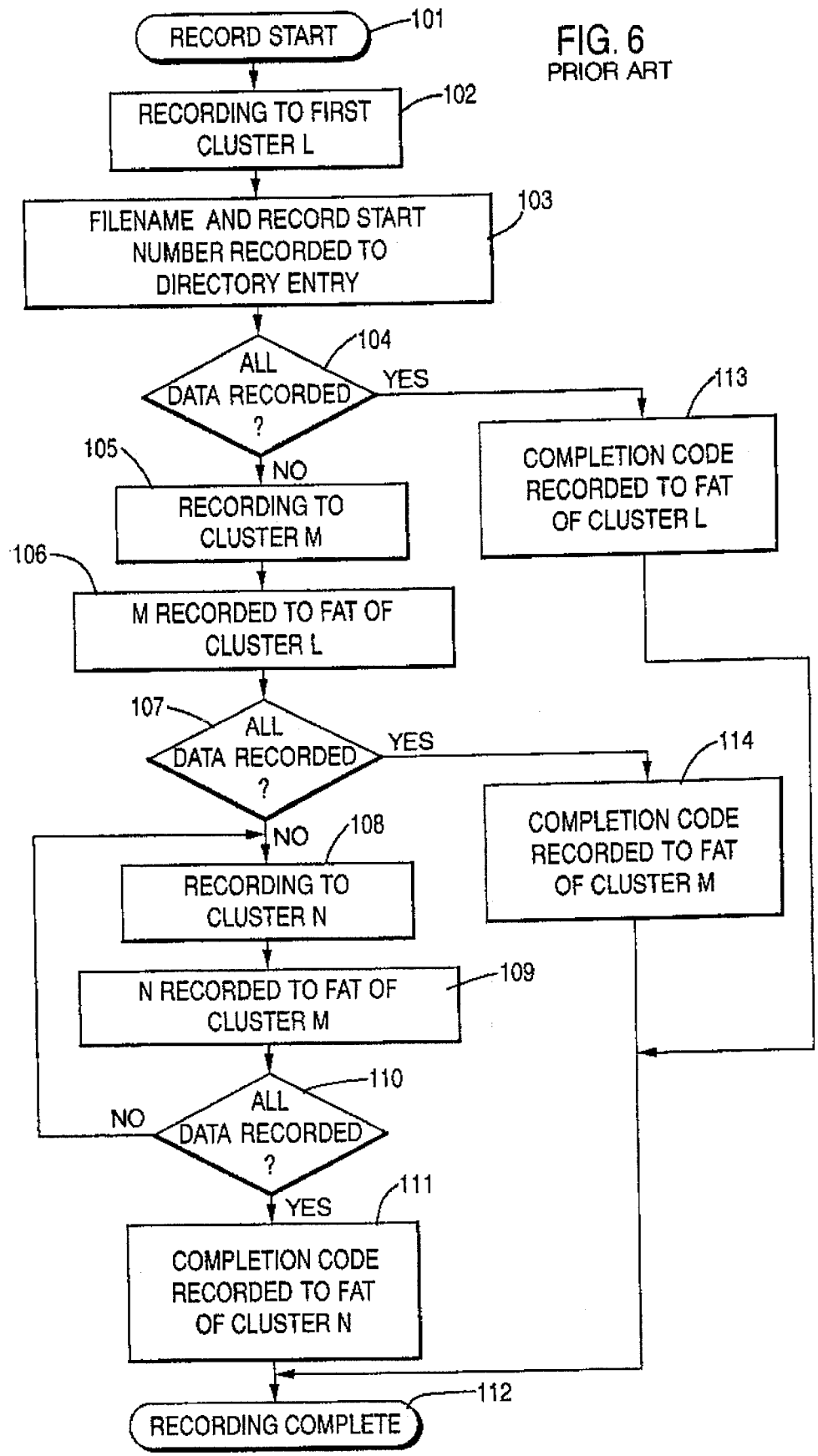
FIG. 6 is a flow chart which illustrates data recording procedures which are typically carried out in an electronic still camera according to the prior art.

An electronic still camera according to the present invention may be similar to one having the circuit configuration depicted in FIG. 3, and/or it may be similar to one whose format for recording data onto a memory card 6 has the same structure as is depicted in FIGS. 4 or 5.

Referring now to FIG. 1 therein depicted is a flow chart which illustrates the procedures for recording image data in an electronic still camera. In performing data recording according to the present invention, it is necessary to search for empty clusters on memory card 6 (i.e., free segments which are not occupied by recorded data and which may be rewritten or filled with data). The present invention makes it possible to detect and locate these empty clusters in advance of recording. It should also be noted, that while the recordable medium discussed herein is preferably a memory card having solid state memory circuits, other recordable mediums may be used with the present invention, including, but not limited to disc drives, floppy discs, magneto-optical discs, etc.

In order to record data (e.g., image data) according to present invention, the processing routine in which recording is performed is entered at step 201. In step 202, data is recorded to the first empty cluster L. Next, in step 203, the file name, the record start cluster number L, and the file size are recorded to the directory entry region portion of the route directory region.

In regard to the file names which are recorded, the present invention provides that such file names may be temporary file names. For example, assume that the file names for the respective image data are recorded as FILE* and that the numbers from 1 to 999 are recorded in the * portion. In this fashion, a sequence of the recorded files can be understood as temporary file names recorded in the step 203. Accordingly, in step 203, 000 is entered into the aforementioned *** portion to record FILE000.

In step 204, a determination is made as to whether all data has been recorded. If not (i.e., not all data has been recorded), processing commences in step 205. If all data has been recorded, processing commences in step 213. More particularly, if there is data of a size which can be recorded into one cluster, processing commences in step 213.

In a case in which step 213 is proceeded to, the final file name is recorded and a completion code, which signifies that it is the last cluster, is recorded to the FAT of cluster L, for example FFFh in the case of a 12-bit FAT, and processing is completed. For the final file name recorded, the aforementioned temporary file name FILE000 is changed, and FILE001, for example, is recorded. In the case where recorded data is later read from the memory card, a determination is made as to whether the file name is the temporary file name (e.g., FILE000) or the final file name (e.g., FILE001). Moreover, a determination can be made as to whether the recorded image data is valid.

If it has been determined that all of the data has not been recorded in step 204, processing commences in step 205. In step 205, data is recorded to cluster M which is the next empty cluster. Next, in step 206, the cluster M number, that is, M, is recorded to the FAT region of cluster L as chained data which has been recorded into cluster L and then into cluster M.

Next, in step 207, a determination is again made as to whether all of the data has been recorded. If not, processing commences in step 208. If all data has been recorded, processing commences in step 214. That is, if there is data of a size which can be recorded into two clusters, processing commences in 214. If step 214 has been proceeded to, the final file name is recorded, and a completion code (FFFh in the case of a 12-bit FAT), which signifies that it is the last cluster, is recorded in the FAT of cluster M, and processing is completed. The final file name which is to be recorded is a modified temporary file name. For example, the temporary file name FILE000 is modified in the same way as described above, and FILE001, for example, is recorded.

If it has been determined that not all of the data has been recorded in step 207, processing commences in step 208 wherein data is recorded into cluster N, which is the next empty cluster. Next, in step 209, the cluster N number, that is, N, is recorded to the FAT of cluster M as chained data which has been recorded into cluster M and then into cluster N.

Next, in step 210, a determination is again made as to whether all of the data has been recorded. If not, processing commences in step 208 wherein there is recording to cluster N, which is the next empty cluster, and the same type of operation is repeated thereafter. If all of the data has been recorded, processing commences in step 211 and the final file name is recorded, and a completion code (FFFh in the case of a 12-bit FAT), which signifies that it is the last cluster, is recorded to the FAT of cluster N, and processing is completed.

By using recording procedures like those described above, in the cases in which the recording of data has been interrupted due to, as mentioned above, the memory card being removed, the battery of the electronic still camera body being removed, or the realization of sharp drops in battery capacity occurring while data is being recorded to memory card 6, the file name inside the directory entry region becomes FILE000 and not FILE* (* represents a number from 1 to 999), which is a final file name. Accordingly, the present invention provides the feature that a determination can be made as to whether it is a file which is in the process of being recorded by looking at the file name in the directory entry region. In the aforementioned embodiment, the data changed at the beginning of recording and the end of recording was considered to be the file name, but this data may be for something other than the file name, for example, the file size or special-purpose flag data.

Figure 2:
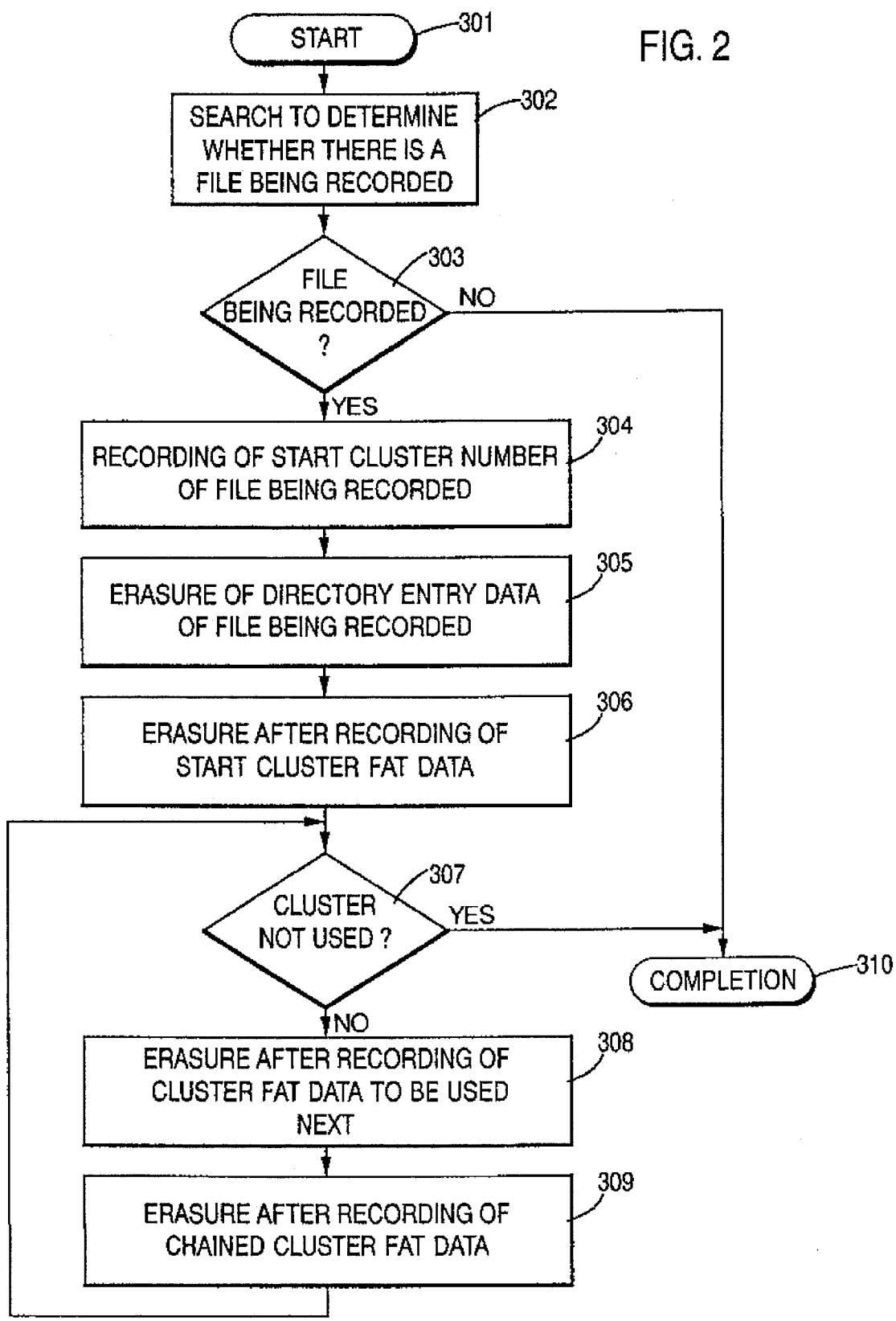
FIG. 2 is a flow chart which illustrates the procedures for recovering and erasing data whose recording had been interrupted according to the present invention.

Next, an example of the processing procedure in a case where the memory card is inserted, and a file which is being recorded, such as that mentioned above, is amongst the data being recorded will be explained with reference to the flowchart depicted in FIG. 2. The recovery unit, i.e., sequence controller 7, recovers data from memory card 6 according to the flowchart depicted in FIG. 2. Memory card 6 is a recording medium. The processing routine in FIG. 2 starts processing with the turning on of the power and the insertion of a memory card into an appropriate receptacle.

In step 302, a search is made to determine whether there is a file which has been only partially recorded. For example, in the case of the aforementioned example, such operation is performed by searching for a directory entry region with the file name FILE000. In step 303, a determination is made as to whether there is a file with a file name such as FILE000. Then, if there is no file with a temporary file name such as that mentioned above, processing commences in step 310 wherein processing is completed.

Conversely, if there is a temporary file name FILE000, such as that mentioned above, processing commences in step 304. First, in step 304, the start cluster number of the file being recorded is stored. Next, in step 305, the data inside the directory entry of the file being recorded is erased. In step 306, erasure takes place after the chained data which was stored in step 304 in regard to the cluster read from the FAT of the start cluster. The erasing in this case is, for example, the recording of 000h, which is a code which signifies an unused cluster.

Next, in step 307, a determination is made as to whether the chained data of the cluster stored in the aforementioned step 306 is a valid cluster number, that is, whether data is recorded in linkage relationship with another cluster. If the cluster number is not valid and there are no chained clusters, processing commences in step 310 wherein processing is completed.

In step 307, if the cluster number is valid and there are chained clusters, processing commences in step 308 (i.e., a cluster which is being examined is used). In step 308, after the data of the FAT of the cluster which is used next is stored in a specified workspace, it is erased. Next, in step 309, after the chained data of the cluster is again read from the FAT of the chained clusters and is stored in a specified workspace, it is erased. Thereafter, there is a return to step 307, and the same type of process is repeated.

By performing the procedures described above, the data for the FAT of the cluster and for the directory entry region of a file which includes the aforementioned temporary file name FILE000 in a file which was only partially recorded became correct data, and it becomes possible to newly record image data thereby enabling effective and efficient use of the circuitry and memory of a memory card.

In the aforementioned embodiment, a case in which the data recorded on the memory card was managed by an operating systems such as MS-DOS was explained, but the present invention is not limited to the MS-DOS data management system. In fact, the present invention is applicable to cases in which data is recorded by other systems which may be preferred. That is, in one in which recording is started and data is recorded in sequence, non-conformities occur in the data when the recording of data is interrupted in progress, so, through the present invention, it is possible to repair and erase data which has nonconformities in order to effectively use the data recording medium which is chosen. Moreover, the data recording medium is not limited to a memory card, but may include other mediums such as magnetic mediums (e.g., flexible and fixed disc drives), magneto-optical mediums and any other suitable medium which is now known or may be utilized in the future.

As mentioned above, the present invention as just described will allow electronic still cameras to be able to accurately determine whether a recording operation was interrupted or improperly executed in progress by modifying, at the point of completion of recording, the data recorded at the start of recording. Also, since it is possible to recover and erase the data being recorded through the appropriate procedure when it has been detected that the recording operation was interrupted in progress, it becomes possible to eliminate the regions where invalid data is recorded and to utilize a memory card or other recording medium very effectively.

Having now fully described and disclosed the present invention, it will be readily appreciated and understood that many modifications and changes may be made to the invention without departing from the spirit or scope of the present invention which is defined in the appended claims and their equivalence.

What is claimed is:

1. An electronic still camera comprising:

an imaging unit to produce image data corresponding to an image of a subject to be imaged;

a recording medium to record said image data; and a sequence controller to control recording of said image data on said recording medium, said sequence controller configured to modify specified data to be recorded at the beginning of the recording of said image data on said recording medium, said specified data indicating the validity of said image data.

2. The electronic still camera according to claim 1, wherein said sequence controller modifies said specified data after said image data has been recorded.

3. The electronic still camera according to claim 2, wherein said specified data comprises file management data used by said recording medium.

4. The electronic still camera according to claim 2, further comprising a data recovery unit to recover data recorded on said recording medium if said specified data has been recorded.

5. The electronic still camera according to claim 3, further comprising a data recovery unit to recover said image data recorded on said recording medium when said specified data is recorded.

6. The electronic still camera according to claim 4, wherein the data recovery of said data includes the deletion of data in said specific data.

7. The electronic still camera according to claim 2, wherein said recording medium is an addressable memory device.

8. The electronic still camera according to claim 7, wherein said addressable memory device is a memory card comprising addressable read/write memory circuits.

9. An electronic still camera comprising:

an imaging unit to produce image data corresponding to an image of a subject to be imaged;

an addressable recording medium to record said image data and storage data, said addressable recording medium being logically arranged to record said image data in at least one segment of said addressable recording medium, said at least one segment having a unique address, said storage data indicating storage attributes of said image data, and a sequence controller to control recording of said image data in said at least one segment of said addressable recording medium; said sequence controller configured to modify said storage data upon the proper recording of said image data in said at least one segment of said addressable recording medium.

10. The electronic still camera according to claim 9, wherein said storage data comprise file management data pertaining to said addressable recording medium.

11. The electronic still camera according to claim 9, further comprising a data recovery unit to recover said storage data and said image data recorded on said recording medium when said storage data is recorded.

12. The electronic still camera according to claim 11, wherein the data recovery of said image data and said storage data includes the deletion of said image data and said storage data.

13. The electronic still camera according to claim 9, wherein said addressable recording medium is a solid state addressable memory device.

14. The electronic still camera according to claim 13, wherein said addressable memory device is a memory card comprising addressable memory circuits.

15. A method of recording image data adapted for use with an electronic still camera, said method comprising the following steps:

generating image data from light rays received by an imaging system of said electronic still camera;

establishing a temporary identifier to be associated with said image data;

recording said temporary identifier and said image data in a memory device of said electronic still camera, said memory device including multiple recording segments;

modifying said temporary identifier to be a modified identifier if said image data has been properly recorded during said recording step; and recording said modified identifier in said memory device of said electronic still camera.

16. The method according to claim 15, wherein said establishing step includes the generation of a temporary file name associated with said image data.

17. The method according to claim 15, wherein said recording step includes the chaining of multiple segments of said memory device when the quantity of said image data is larger than a single segment of said memory device.

18. The method according to claim 15, wherein said temporary identifier contains information associated with said image data.

* * * * *